Aug. 30, 1938.　　　　J. SCHLITZ　　　　2,128,330
EPICYCLE ENGINE
Filed July 5, 1935　　　　16 Sheets-Sheet 3
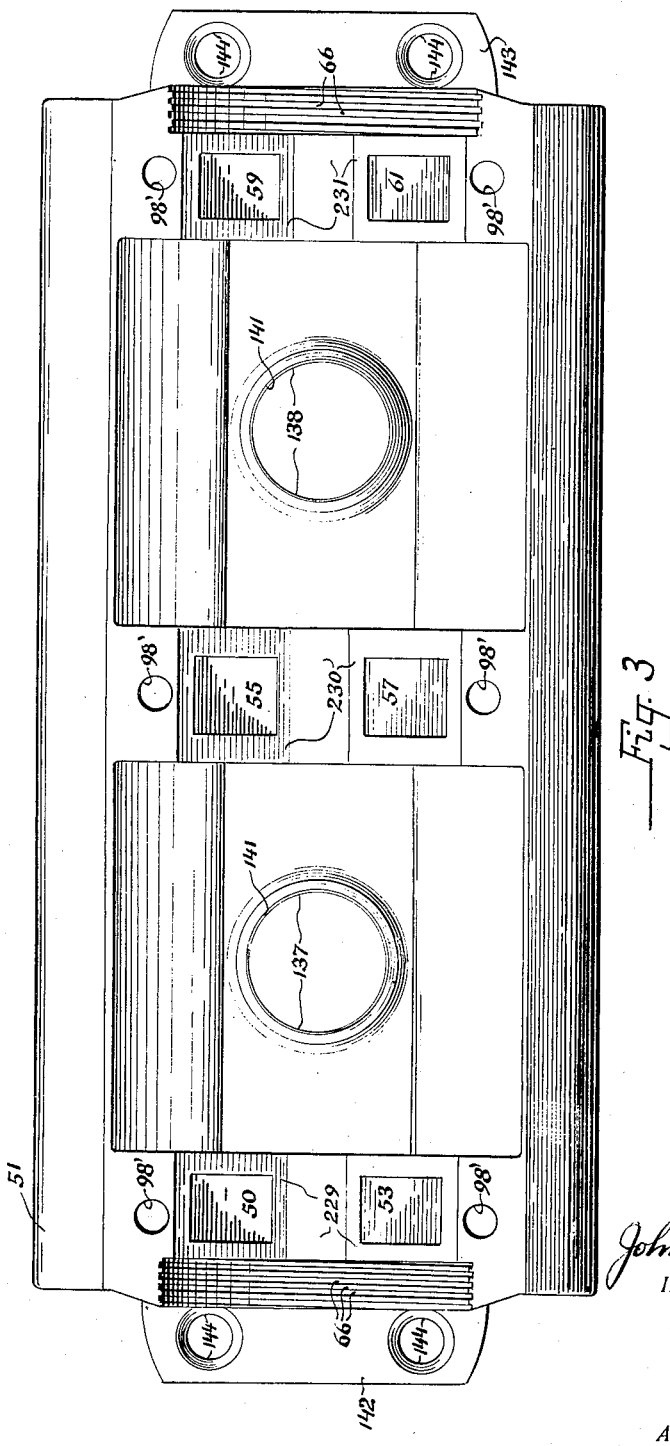

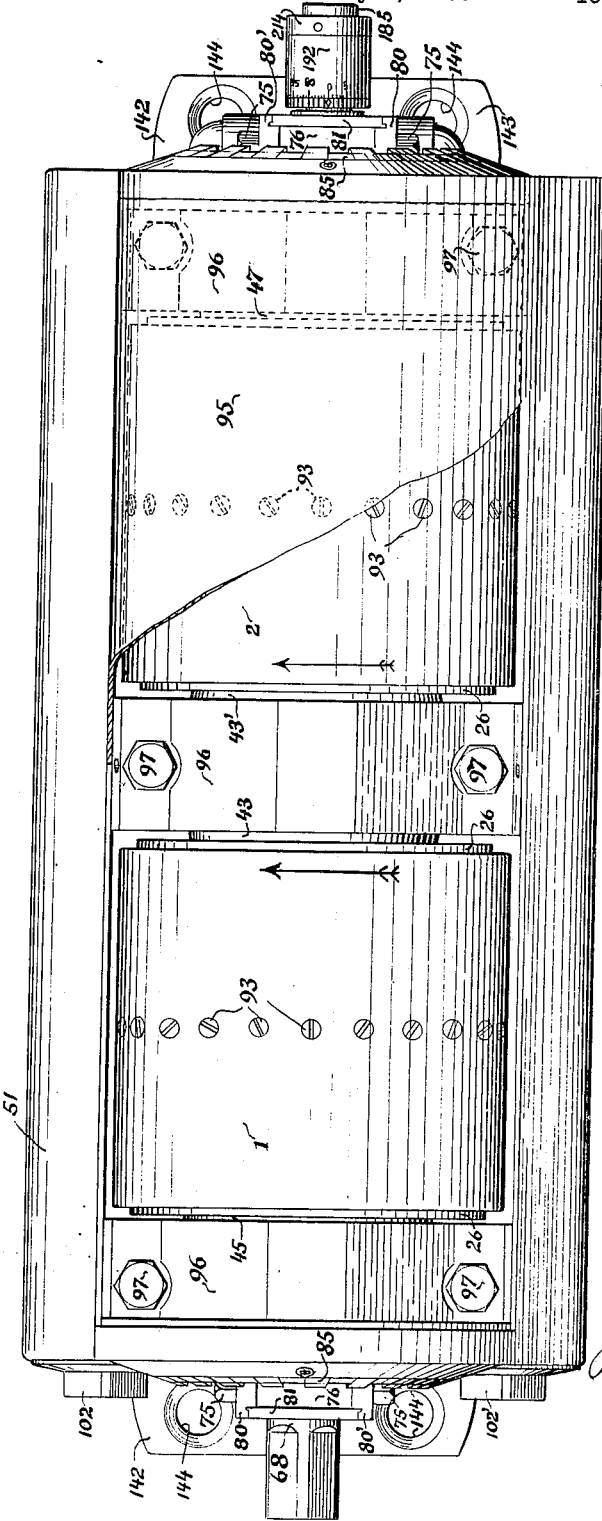

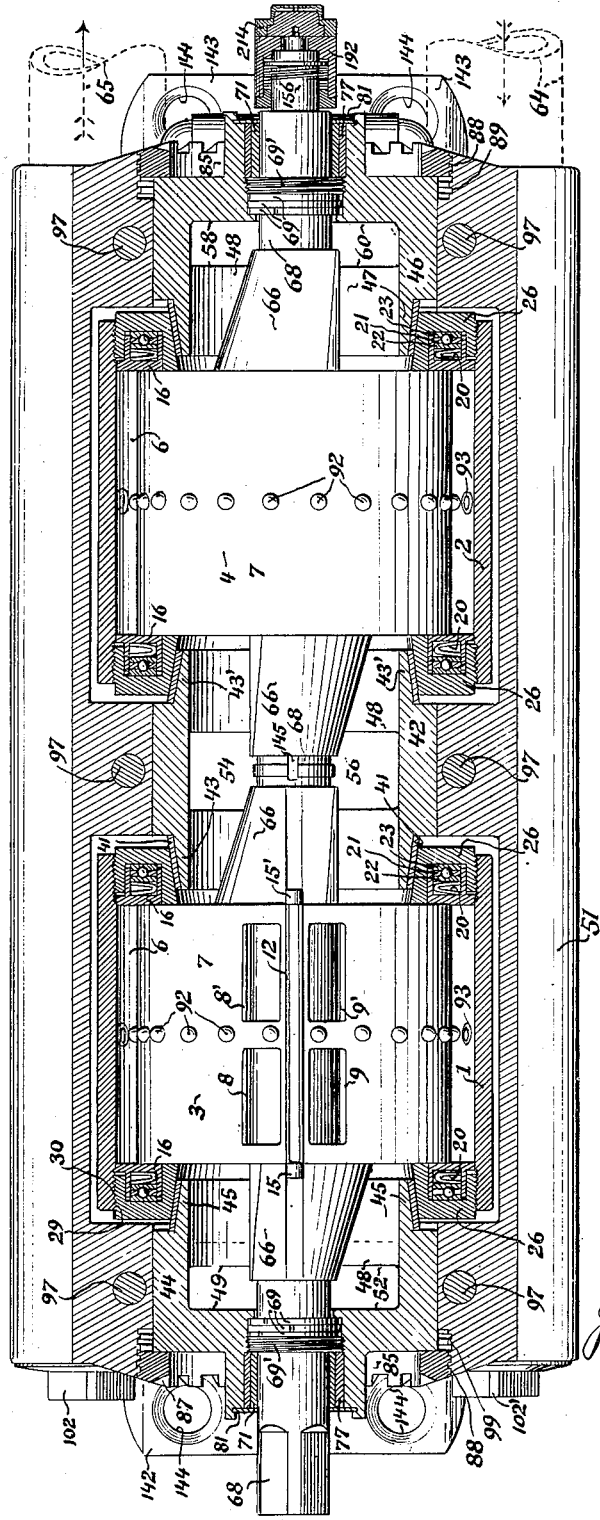

Aug. 30, 1938.     J. SCHLITZ     2,128,330
EPICYCLE ENGINE
Filed July 5, 1935     16 Sheets-Sheet 4
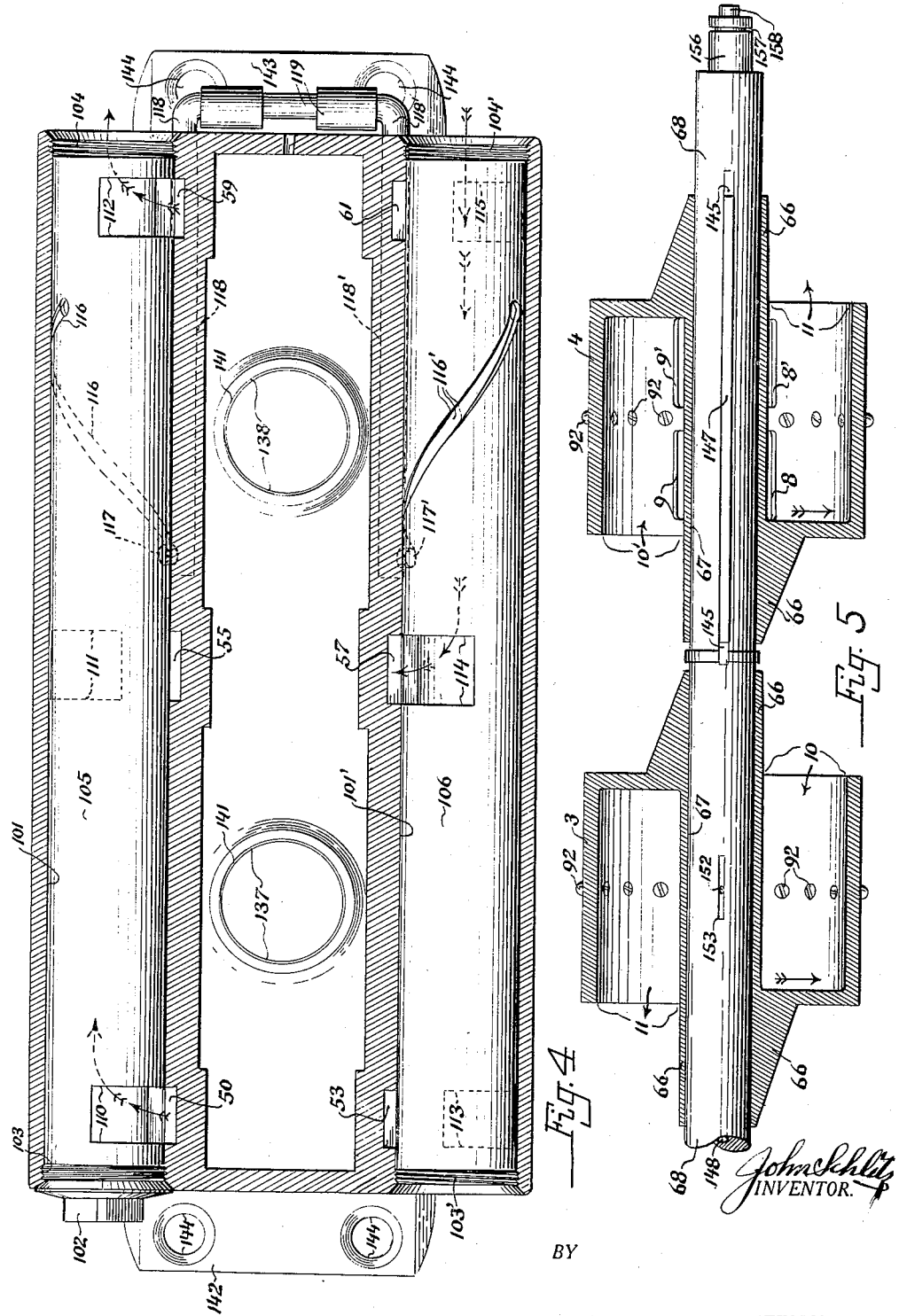

Aug. 30, 1938.   J. SCHLITZ   2,128,330
EPICYCLE ENGINE
Filed July 5, 1935   16 Sheets-Sheet 5
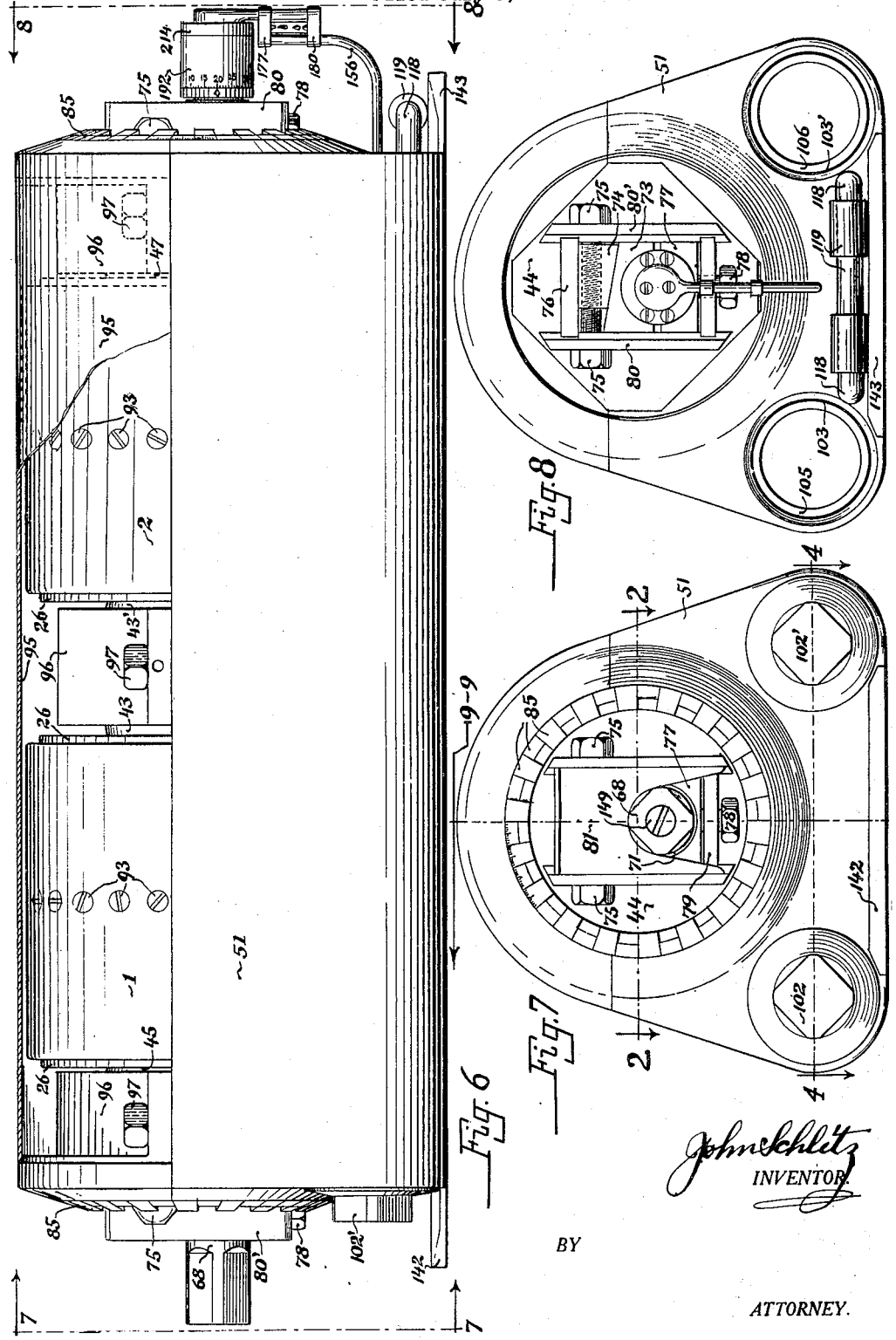
John Schlitz
INVENTOR
BY
ATTORNEY.

Aug. 30, 1938.                J. SCHLITZ                    2,128,330
                              EPICYCLE ENGINE
                          Filed July 5, 1935           16 Sheets-Sheet 6
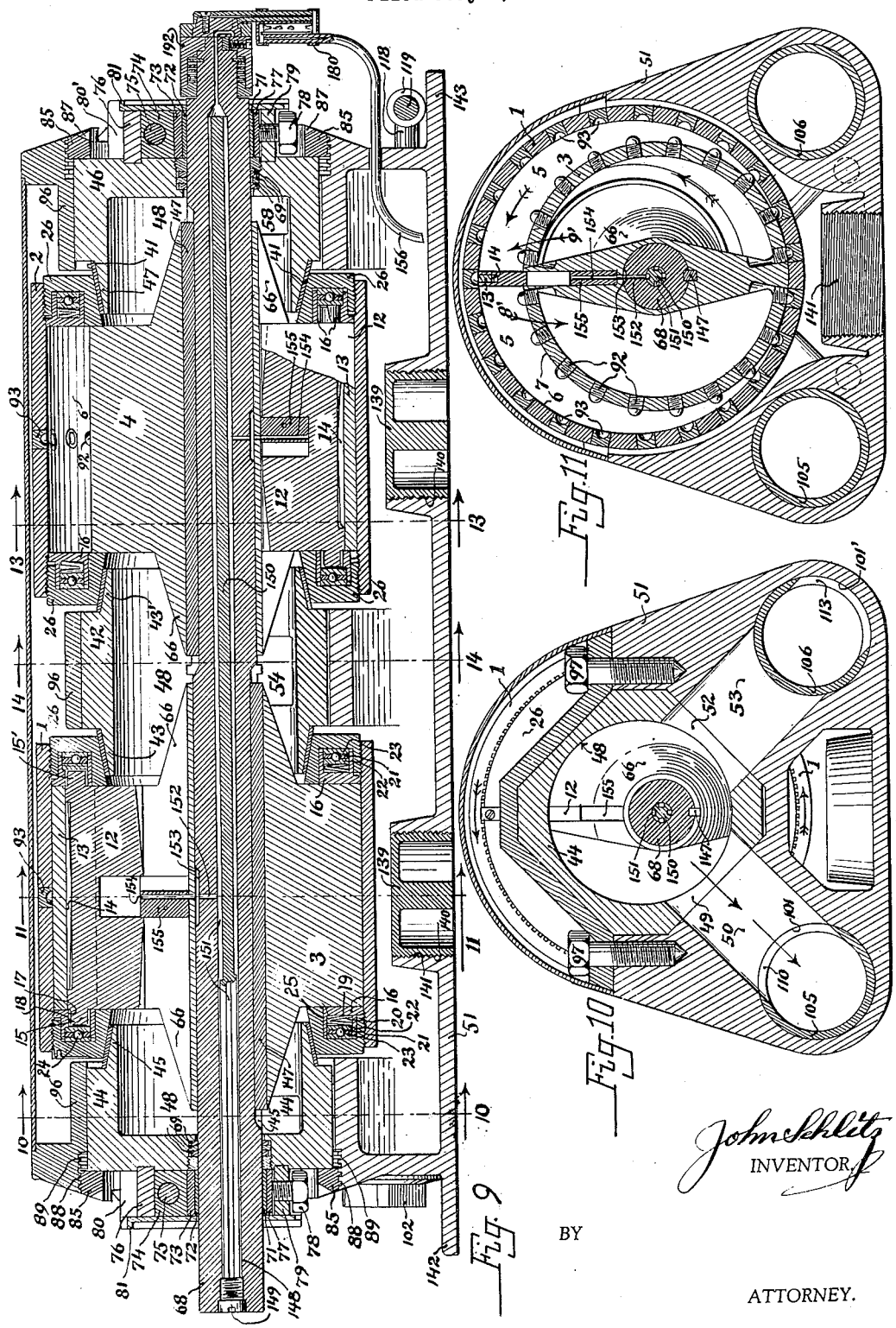
John Schlitz
INVENTOR
BY
ATTORNEY.

Aug. 30, 1938.   J. SCHLITZ   2,128,330
EPICYCLE ENGINE
Filed July 5, 1935   16 Sheets-Sheet 7
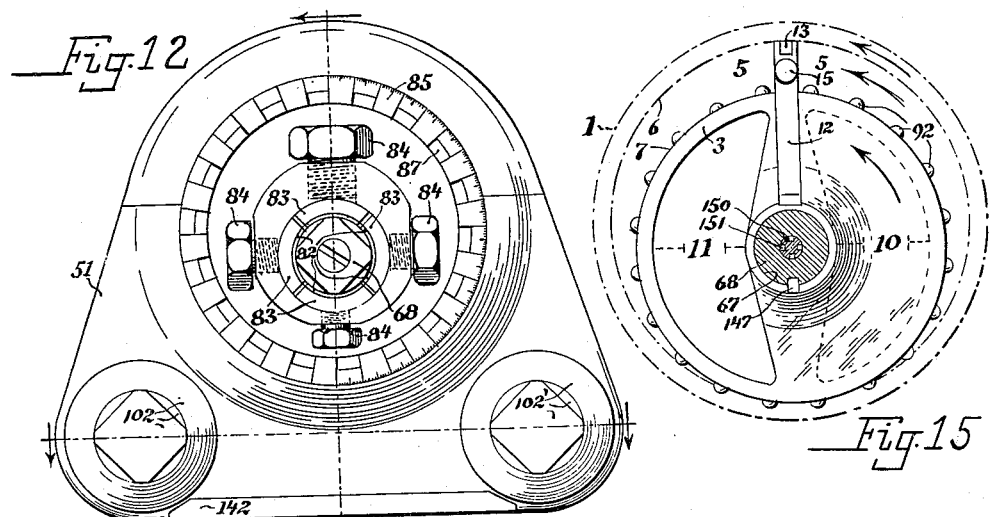
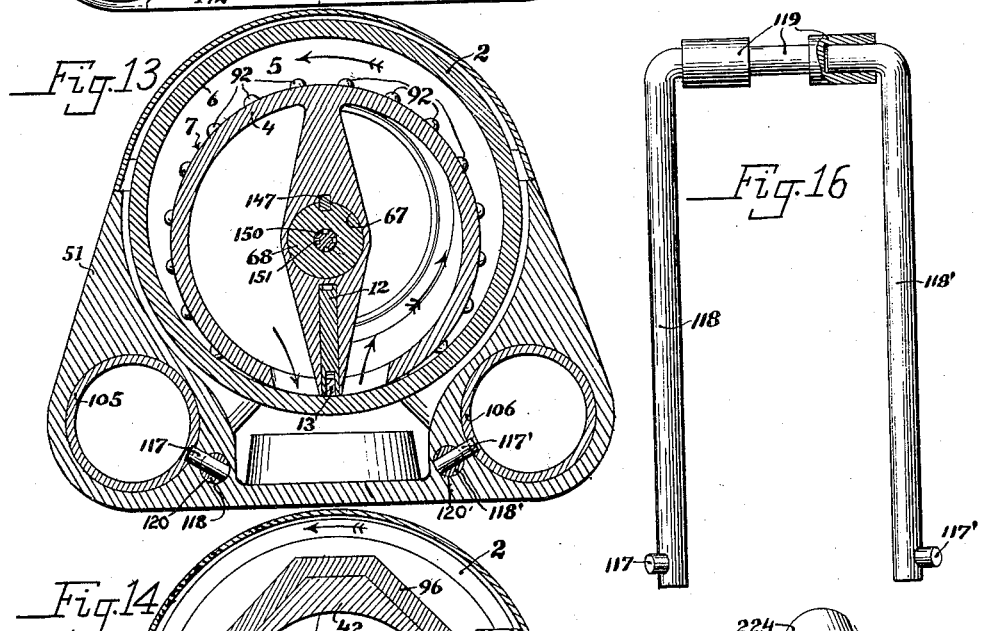
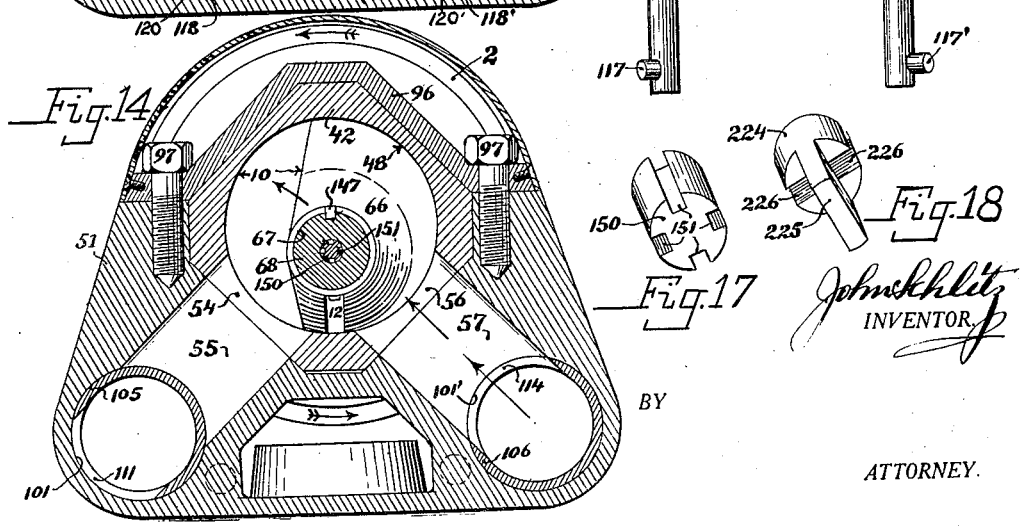

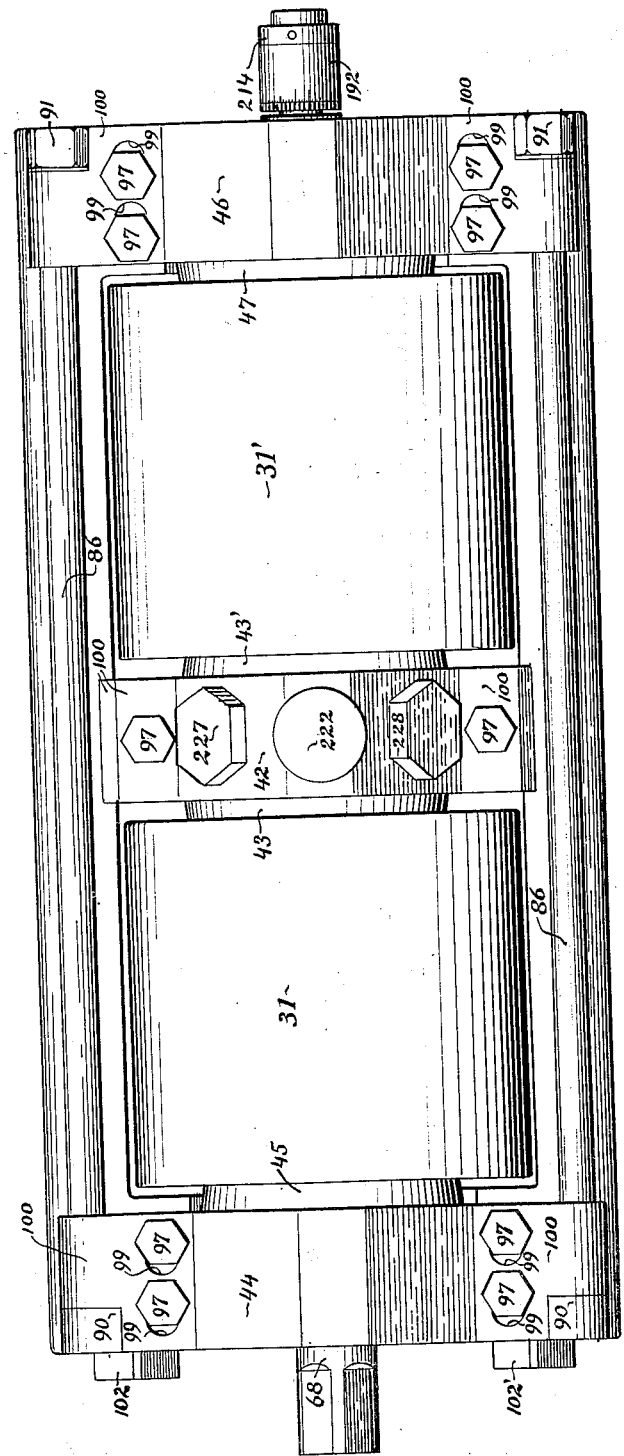

Aug. 30, 1938.  J. SCHLITZ  2,128,330
EPICYCLE ENGINE
Filed July 5, 1935  16 Sheets-Sheet 9
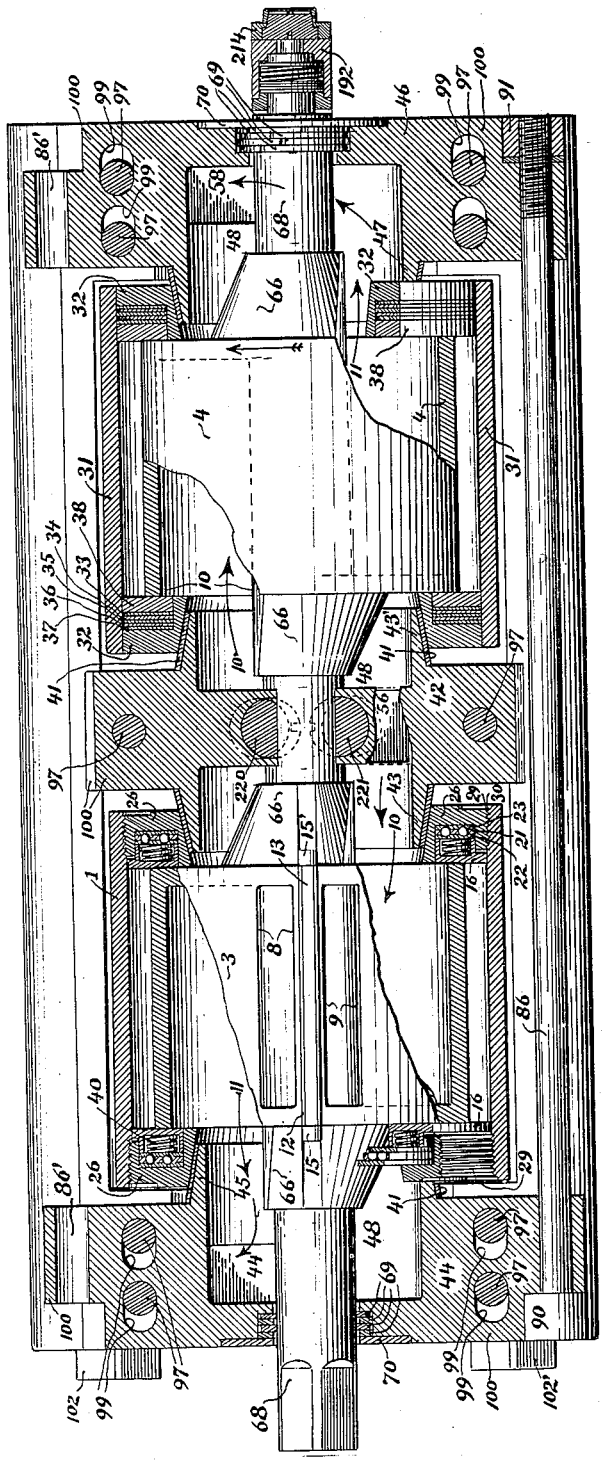
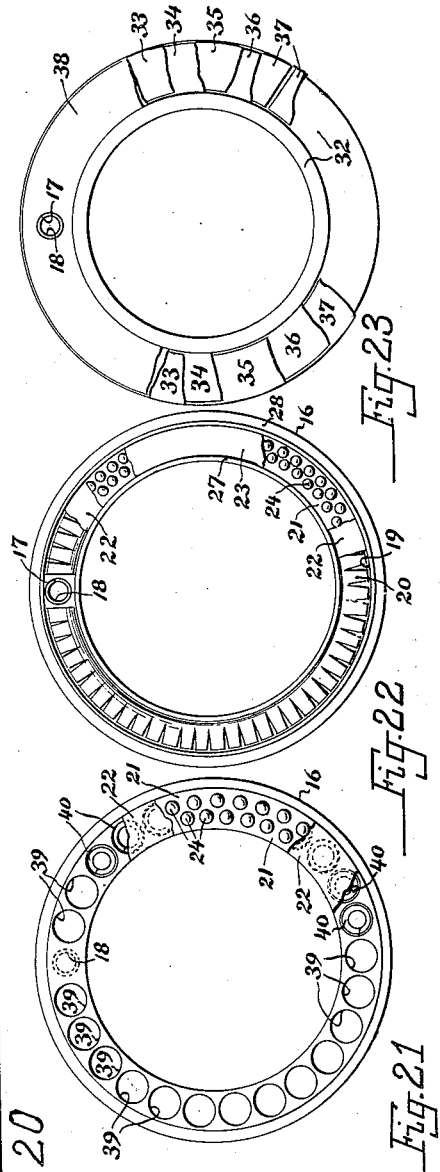

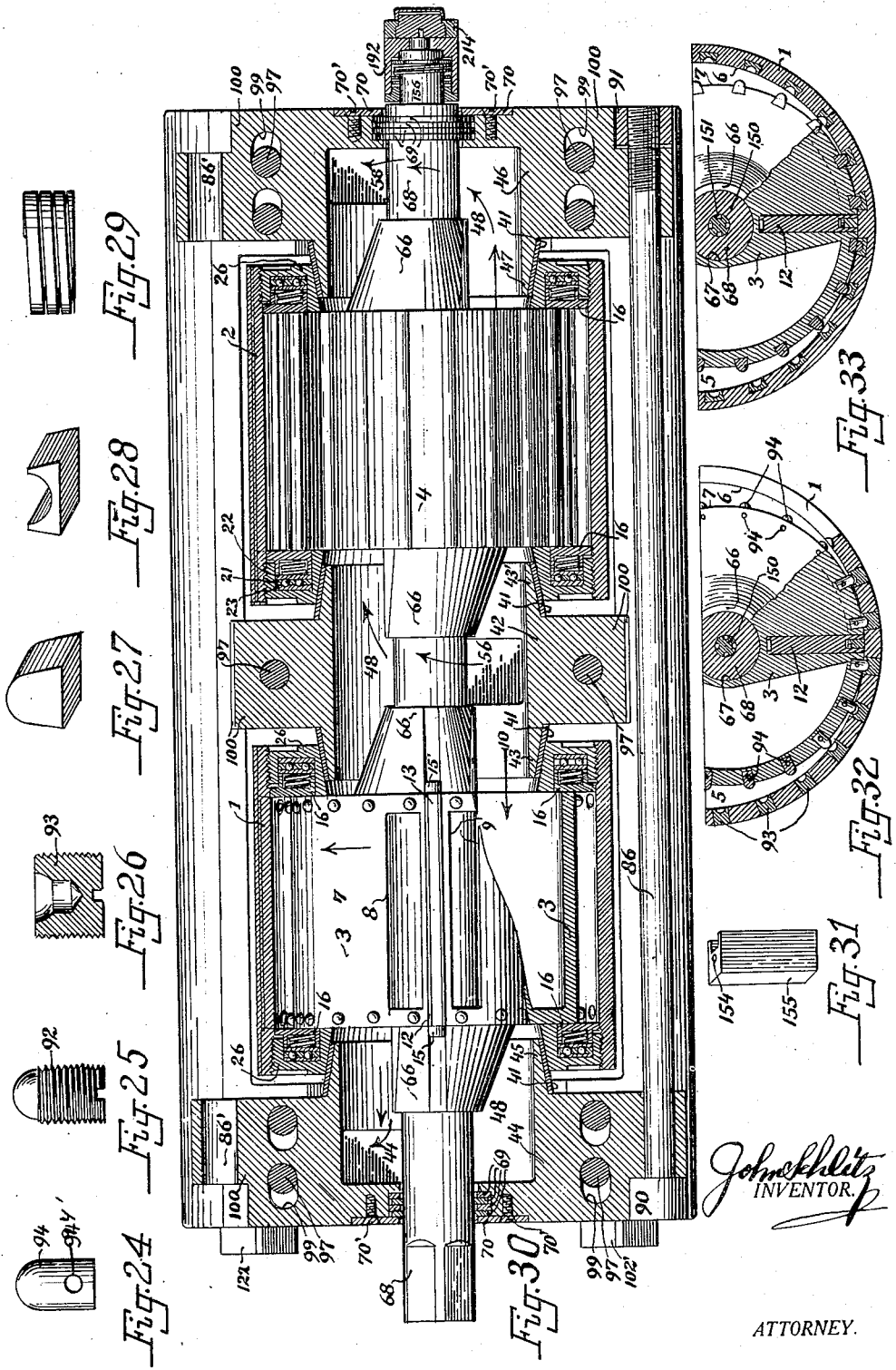

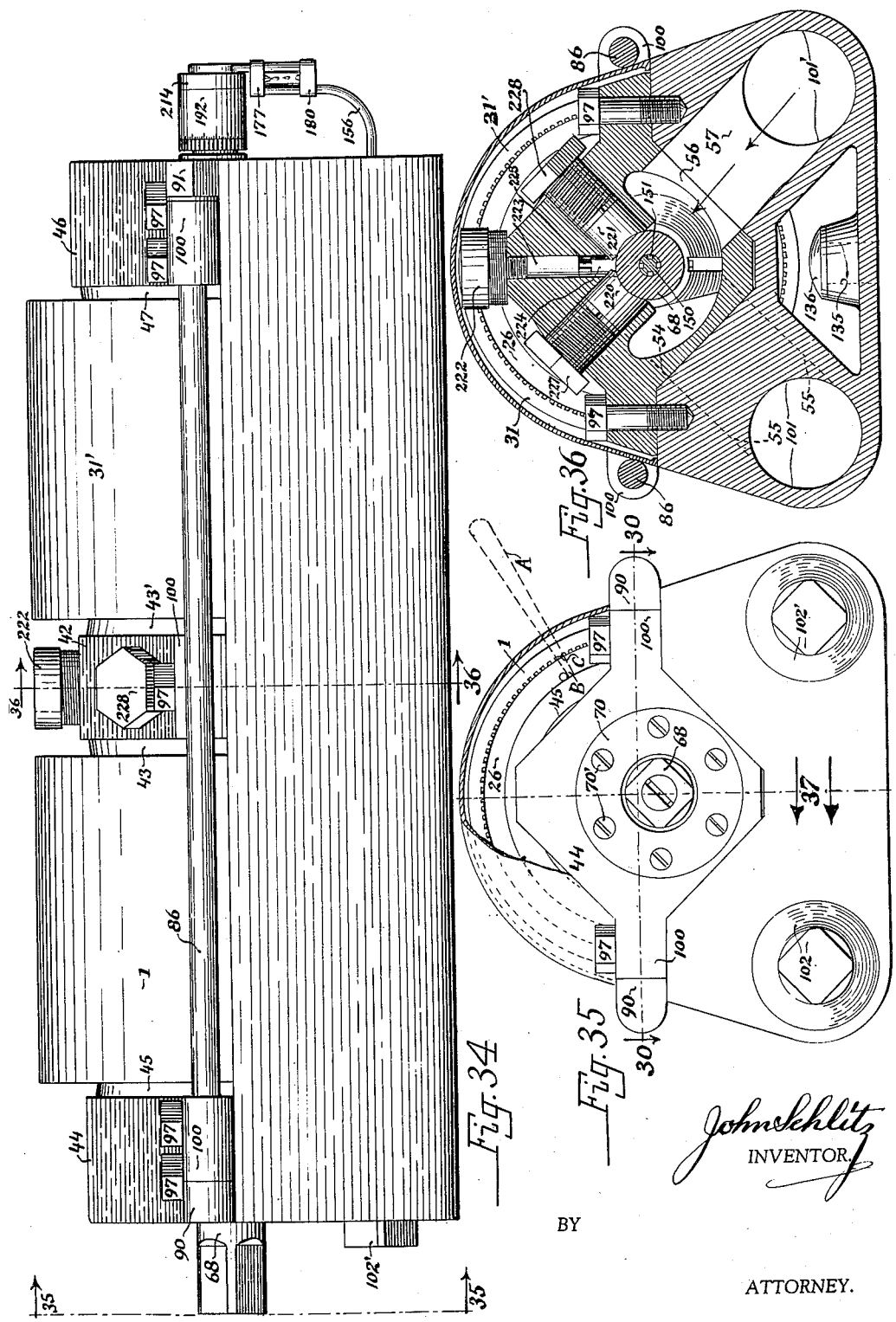

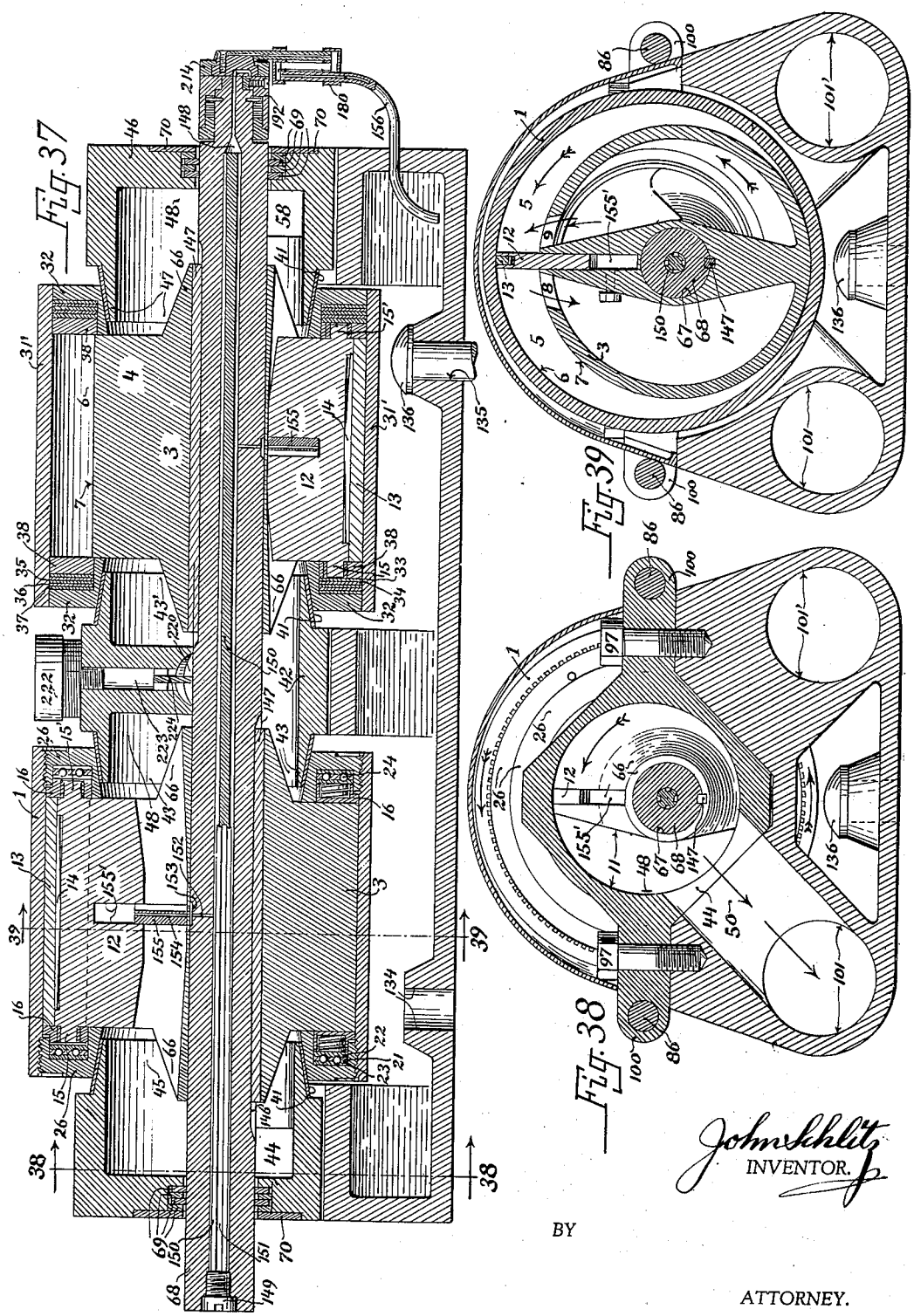

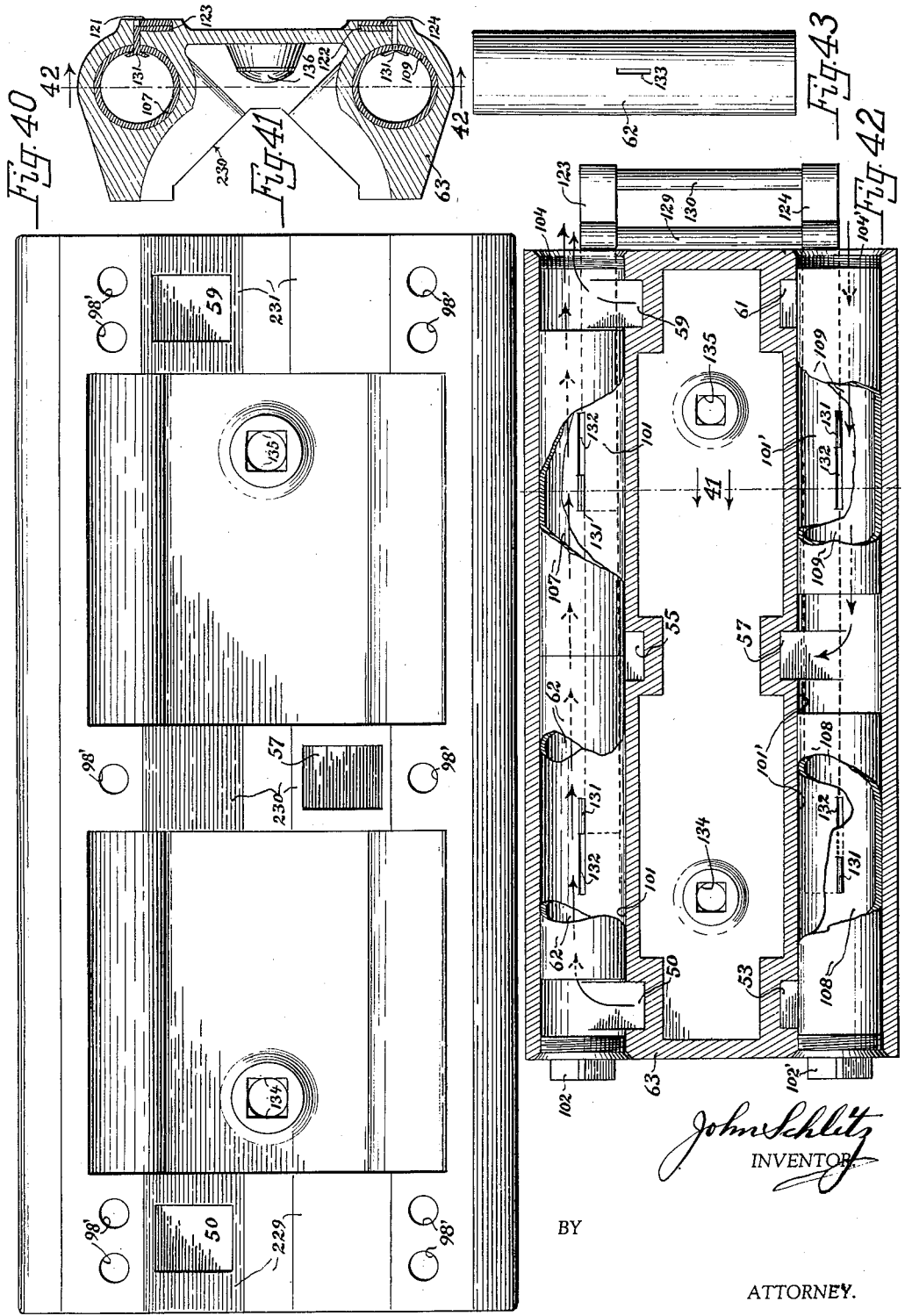

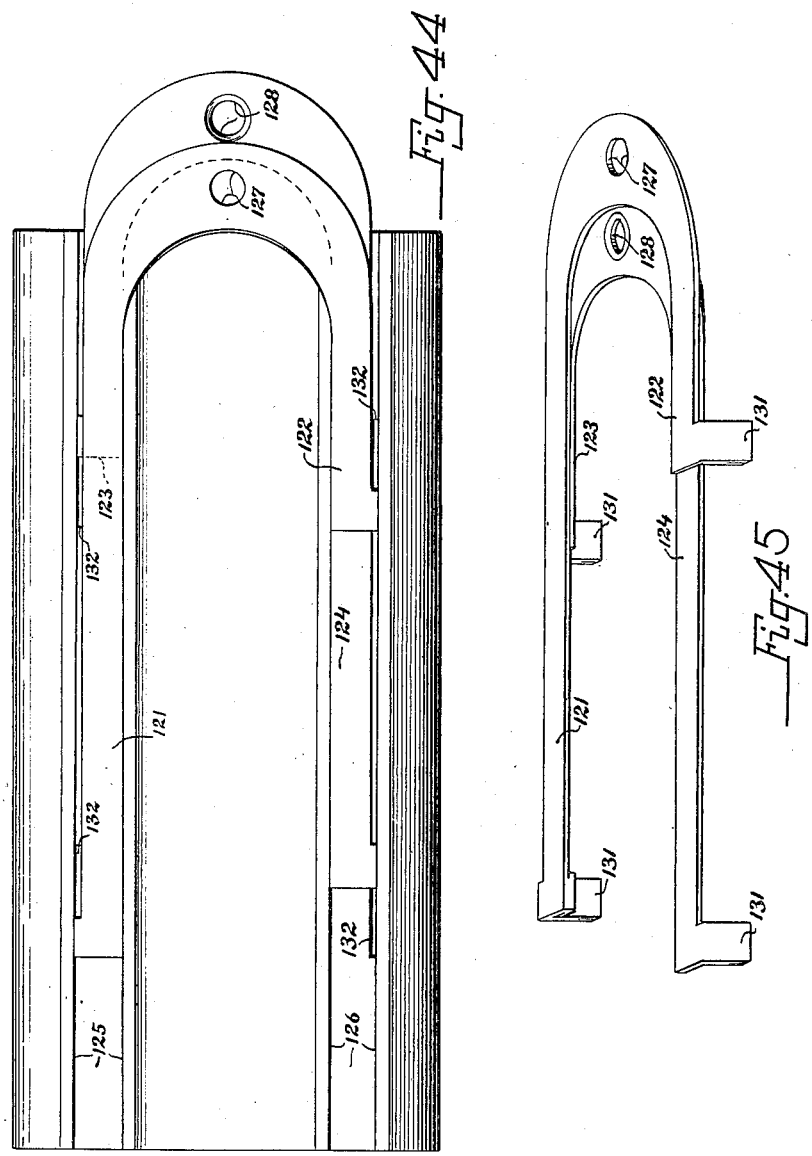

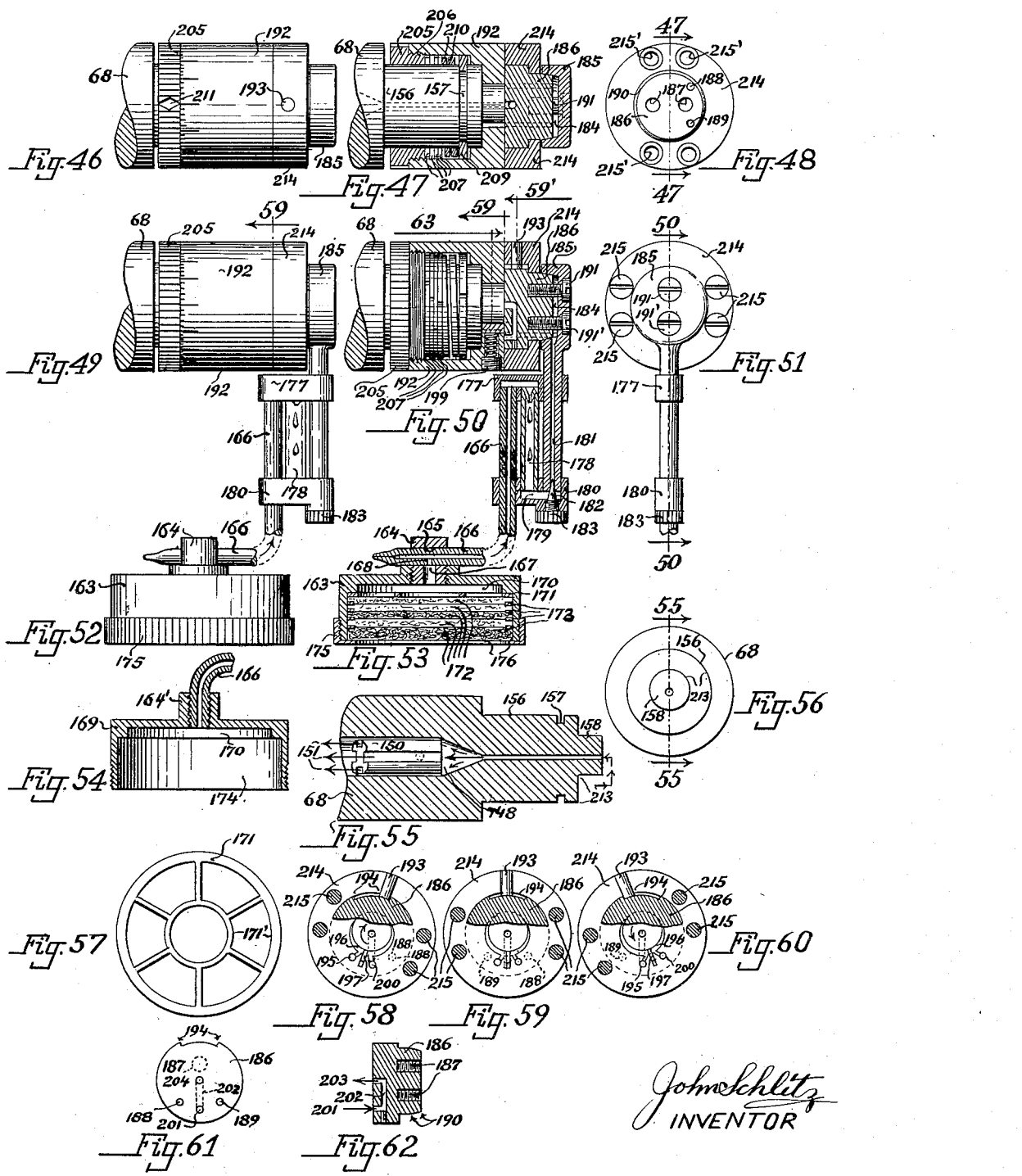

Aug. 30, 1938. J. SCHLITZ 2,128,330
EPICYCLE ENGINE
Filed July 5, 1935 16 Sheets-Sheet 16
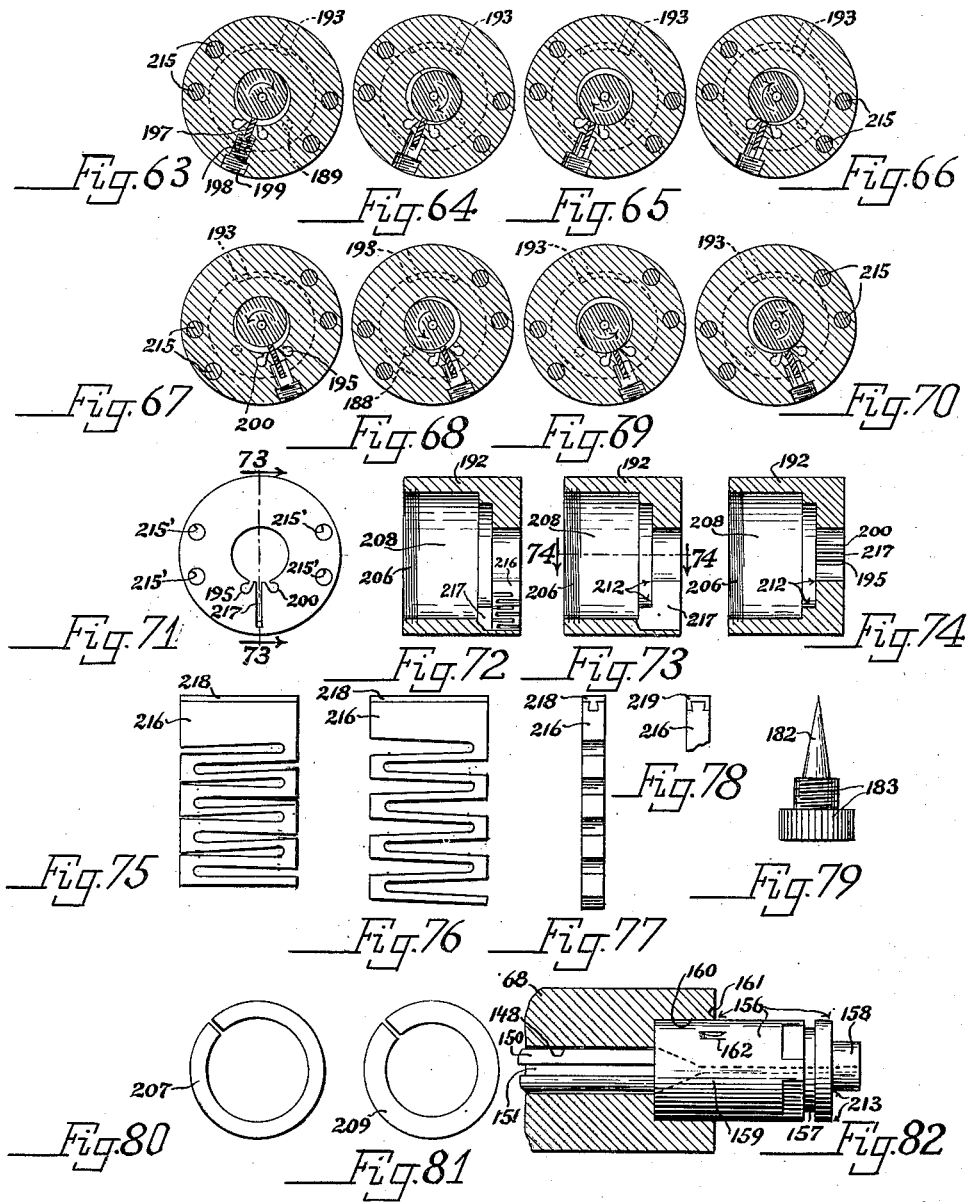

Patented Aug. 30, 1938

2,128,330

UNITED STATES PATENT OFFICE 2,128,330

EPICYCLE ENGINE

John Schlitz, Leavenworth, Kans., assignor of one-half to Ida Wilhelm Brugger, Tuckahoe, N. Y.

Application July 5, 1935, Serial No. 30,032

12 Claims. (Cl. 103—121)

The invention, the "Schlitz epicycle engine" is a new engine, typical of a new order of motion and new function and of new combination of parts, which together may be henceforth universally accepted as a newly established fundamental principle of a new order of motion and of a construction capable of serving various purposes of the class as hereinafter set forth;

First, to impart two way motion as a power plant, further, to receive power to act as a pump either by right or left turn of the engine, or as a compressor by right or left revolution and possibly set a foundation for a new class of internal combustion engines with added modifications to this new principle.

The second object of my invention is to provide an engine capable of acting as a power plant for setting machinery in motion, capable of being driven by a power plant to act as an air pump, liquid pump, gas pump, air compressor, liquid compressor or gas compressor, and capable of performing these functions without removing or adding a part thereof.

The third object of my invention is to depart from the old established system in which pressure and motion is lost, as for instance, in piston motion and pressure loss in turbines. My engine receives and gives full pressure, depending whether used as power plant or compressor, etc. It is a rotor operated by actual pressure rather than the blow of steam and will suck or compress liquid or gas rather by confinements of inlet and outlet chambers than velocity. And in addition, my engine is capable of imparting such motion, compression, or suction regardless of direction of rotation of the engine.

The fourth object of my invention is, for example, if used to draw air from a tank to provide capability of producing a complete vacuum, regardless of direction of rotation of the engine.

The fifth object of my invention is to provide an engine which, (for instance while operating as a pump), will pump with equal force whether the engine rotates to right or left. And if the engine serves as a marine motor or hoist engine, its rotatory action can be reversed almost instantly and also gradually and when the rotation of the engine is reversed it will continue in reversed motion with the same force and effect following a shift of inlet and outlet valves of the engine bed. With this object, the oil regulator and oil feeder (being related to and typical in function of the engine) continues feeding oil regardless of the direction of rotation of the engine shaft from which it is powered and attached.

The sixth object of my invention is to provide an engine in which the wear can be easily and most accurately taken up and which can be more easily assembled and with less trouble taken apart for repairs and replacement of parts.

The seventh object of my invention is to provide an engine in which expansion and contraction of heated parts automatically take care of themselves to provide smooth and steady running order and prevent escape of pressure.

The eighth object of my invention is to provide a smaller, less expensive, more efficient and compact motor engine; pump and compressor, to, as aforesaid, serve any one of the said different purposes and all of said purposes; one purpose at a time without being a combine or combination of two or more separate combination of means.

The ninth object of my invention is to provide an engine in reduced weight per horse-power as an auxilio-motor and to provide an engine which will do more work within its weight and size as a compressor or pump, etc.

The tenth object of my invention is to provide an engine in which two major revolving parts auxiliarily co-operate to eliminate major friction and to eliminate vibration while operating as an auxilio-motor, compressor, pump, etc., which may be named twin-auxilio-axisymmetric-rotor or epicycle-engine.

The eleventh object of my invention is to provide an engine capable of possessing large enough intake and exhaust mouths to provide greater speed or more work therefrom according to the applied uses and purposes.

The twelfth object of my invention is to provide a standard engine, serviceable as an airship motor, marine motor, automobile motor or stationary engine or pump, etc., capable of being manufactured in any size for any of said aforementioned purposes according to need in air, on land or sea, as a motor, pump or compressor, for passage of liquid, or gas, to produce power, pressure or vacuum by movement of a gate within one or a plurality of epicycloid spaces.

The thirteenth and final outstanding object of my invention is to provide one or more engines of the class described each engine adaptable to and for said foregoing various uses and purposes without a departure from or a re-arrangement of parts thereof, other than the shifting of the inlet and outlet valves which are movably mounted in the engine bed.

With the above and other objects in view, my invention rests wholly or in part chiefly "duad" in an inner and outer drum or a pair of inner and outer drums duad in nature; in general in a cylindrical outer drum about an inner eccentrically located cylindrical valve drum, both drums auxiliary to each other, each with a separate axis, the inner one or valve drum being eccentric-axis-axisymmetric with the said cylindrical outer drum to form a convexo-concave space between the inner wall of the cylinder and the outer wall of the said valve drum, valve ports being furnished in said valve drum, and a slidable pressure gate being furnished between said ports. Said slidable gate is located between said valve mouths to divide the said valve mouths to separate the pressure of intake and outlet within an epicycloidal space. There are provided a means on the side of the pressure gate to keep the said pressure gate against the inner wall of the said cylinder, an engine bed, bearings on said engine bed to journal the twin eccentric auxilio-axes by hub and shaft, valves in said engine bed, an oil filter therein, an oil regulator thereon, an oil feed pump on the end of said shaft of the said valve drum in consociate corollary form, and means on said engine bed to take up wear and give way to expansion of overheated parts.

The words A and AN in the specification and certain appended claims are duad in meaning to be construed to mean one or two units treated as one, since an engine of the class with single cylinder is understood to be operatable while duad or double counterbalancing valve drums with cylinders with opposite convexo-concave chambers as shown and described furnish smoother and more even drawing power, as for example, the difference in an old one cylinder and plurality cylinder piston type engine.

My invention generally extends to embody the peculiar features of construction and new function and novel arrangement of parts set forth in the following description, especially stated in the appended claims, and illustrated in the accompanying sixteen sheets of drawings, wherein like characters indicate like corresponding parts throughout, and in which:

Figure 1 is a top elevation of my invention;

Figure 2 is a central vertical sectional view of the engine on line 2—2, Figure 7, with the valve drum, pressure gate and the shaft with the packings on the end of said shaft in elevation;

Figure 3 is a top elevation of the engine bed;

Figure 4 is a central vertical sectional view of the engine on line 4—4 Figure 7 with the sleeve valves in elevation;

Figure 5 is a central vertical sectional view of the valve drum, with the shaft and key of the shaft in elevation;

Figure 6 is a side elevation of my invention with the cover partly in section;

Figure 7 is a front elevation on line 7—7 Figure 6;

Figure 8 is a rear elevation of my invention, on line 8—8 Figure 6, but, with the cover of the bearing box and take-up gauge removed;

Figure 9 is a central vertical sectional view of my invention on line 9—9 Figure 7 in the direction of the arrow;

Figure 10 is a sectional view on line 10—10, Figure 9 of my invention;

Figure 11 is a cross-section on line 11—11 Figure 9 of my invention;

Figure 12 is a front elevation of my invention, but, with the bearing of the shaft in a modified form;

Figure 13 is a sectional view on line 13—13 Figure 9;

Figure 14 is a sectional view on line 14—14 Figure 9;

Figure 15 is a front elevation of the valve drum and of the pressure gate in relation to the cylindrical drum;

Figure 16 is a top elevation of the valve-adjusting lever, but with one end of the female part thereof in section;

Figure 17 is an enlarged perspective view of the oil divisioner;

Figure 18 is an enlarged perspective view of a central bearing key;

Figure 19 is a top elevation of my invention, but, with the engine bed and its bearing and wear-take-up means in consociate corollary form showing another method of carrying the invention into effect;

Figure 20 is a central vertical sectional view of the engine on line 30—30 Figure 35 with the valve drum, pressure gate and the shaft and one packing of the said shaft in elevation, with said valve drum partly in broken section;

Figure 21 is an elevation of the heating-expander-ring with a broken part of a layer of a runner plate and ball bearing plate as for example, shown against the sides of the left hand valve drum of Figure 20;

Figure 22 is an elevation of the heating-expander-ring in consociate corollary form with a broken part of the ball bearing plate between two broken parts of the runner plates, as for example applied against the side of the valve drum of Figure 2 and Figure 9;

Figure 23 is an elevation of the hub of the cylinder in further consociate corollary form with broken layers of packing plates between the said hub and the gate control ring, and as for example shown applied against the sides of the right valve drum of Figure 20;

Figure 24 is a side elevation of a non-adjustable male cog of the valve drum shown in Figure 32;

Figure 25 is an adjustable male cog of the valve drum Figure 11;

Figure 26 is an adjustable female cog as applied for example in Figure 11 and Figure 32;

Figure 27 is a male cog bar as shown applicable for example in Figure 33;

Figure 28 is a female cog bar as shown applicable for example in Figure 33;

Figure 29 is a coil spring as applicable for example into related holes (provided for said springs) of Figure 21 of the heating-expander;

Figure 30 is a vertical central view of the engine as in Figure 20, but showing the arrangement of the cogs of Figure 24 and Figure 26 on the left valve drum (for example) and showing (for example) the cog bars of Figure 27 and Figure 28 on the right hand valve drum;

Figure 31 is a perspective view of a means in the gate to prevent passage of pressure;

Figure 32 is a partial sectional view of left hand valve drum of Figure 30;

Figure 33 is a partial sectional view of the right hand valve drum of Figure 30;

Figure 34 is a side elevation of my invention of the Figure 19 example;

Figure 35 is a front elevation of the engine on line 35—35 Figure 34;

Figure 36 is a central cross-section of the engine on line 36—36 Figure 34;

Figure 37 is a central vertical sectional view of the engine on line 37—37 Figure 35;

Figure 38 is a sectional view of the engine on line 38—38 of Figure 37;

Figure 39 is a sectional view of the engine on line 39—39 Figure 37;

Figure 40 is a top view elevation of the engine bed of the engine of Figure 19;

Figure 41 is a central vertical sectional view of the engine bed on line 41 Figure 42;

Figure 42 is a central sectional view through the engine bed and through the sleeve valves on line 42—42 Figure 41, with sleeve valves broken;

Figure 43 is a side elevation of a sleeve valve;

Figure 44 is a bottom elevation of the engine bed of Figure 40 with the sleeve moving means;

Figure 45 is a perspective view of the sleeve moving means in reversed action to the sleeve moving means in Figure 44;

Figure 46 is a top elevation of the epicycle oil pump attached to the end of a shaft;

Figure 47 is a central vertical sectional view of the epicycle pump on line 47—47 Figure 48, but with the shaft section thereof in elevation;

Figure 48 is a rear elevation of the epicycle pump, with the oil regulator removed;

Figure 49 is a side elevation of the epicycle pump attached to the oil regulator;

Figure 50 is a central vertical sectional view of the pump and view through the oil regulator on line 50—50 Figure 51 with the shaft section, the adjustors, packing rings, anchor ring and spring on the said shaft in elevation;

Figure 51 is a rear elevation of the oil pump with the regulator;

Figure 52 is a side elevation of an oil filter;

Figure 53 is a central vertical sectional view of the oil filter;

Figure 54 is a central vertical sectional view of the casing of the oil filter in consociate corollary form;

Figure 55 is a central vertical sectional view of the end of the engine shaft 68, with a broken section of the oil distributor rod therein in elevation;

Figure 56 is a rear elevation of the shaft 68;

Figure 57 is a top elevation of the plate of the filter;

Figure 58 is a sectional view of the pump on line 59 Figure 50, with a sectional view of a broken central shaded portion of the automatic valve shifter on line 59' Figure 50, showing the arrangement of the oil valves of the pump when the shaft rotates to the right in the direction of the arrow;

Figure 59 is a sectional view of the pump on line 59 Figure 50 with a sectional view of the broken sectional shaded portion of the automatic valve shifter directly on line 59' Figure 50, showing the arrangement at the stand still of the shaft;

Figure 60 is a sectional view of the pump as in Figure 59, but showing the automatic arrangement of the oil valves when the shaft rotates to the left as shown by the direction of the arrow;

Figure 61 is a face elevation of the automatic valve shifter on the line 59 Figure 49 or Figure 50;

Figure 62 is a central vertical sectional view of the automatic valve shifter;

Figure 63 to Figure 66 inclusive are each a like sectional view of the pump on line 63 Figure 50, showing the automatic arrangement of valves and of the oil gate against the eccentric part of the shaft, and showing the provided gradual circular movement of the epicycloidal space in relation to the rotation of the eccentric end of the shaft when the shaft rotates in the direction of the arrow for providing suction and compression according to the diminishing or enlargement of the epicycloidal space on the sides of the oil gate;

Figures 67 to 70 inclusive are each a sectional view as in Figures 63 to 66, but showing the automatically reversed change of the provided inlet and outlet valves when the shaft rotates to the left as shown by the direction of the arrow;

Figure 71 is a rear face elevation of the cylinder of the oil pump on line 59 Figure 49, but with a slot provided for a modified gate of the form shown in Figure 75;

Figure 72 is a central vertical sectional view of the cylinder of the pump on line 73, Figure 71, and with a gate;

Figure 73 is a central vertical sectional view of the cylinder of the pump on line 73—73 Figure 71;

Figure 74 is a central vertical sectional view of the cylinder of the pump on line 74—74 Figure 73;

Figure 75 is a side elevation of the oil gate in consociate corollary form in compressed state;

Figure 76 is a side elevation of the oil gate in expanded state;

Figure 77 is an edge view of the gate of Figure 76, showing a T shaped replaceable shoe;

Figure 78 is a broken edge section of the gate, showing a C shaped replaceable shoe mounted thereon;

Figure 79 is an enlarged side elevation of the oil flow control means of the oil gauge of Figure 50;

Figure 80 is an expandible packing ring of the pump;

Figure 81 is an anchor ring of the pump;

Figure 82 is a side elevation of a replaceable shaft section with an elevation of the oil distributor rod, both attached to a main shaft in a consociate corollary form for replacement of worn parts.

In the accompanying drawings the numeral 1 indicates a front rotatable cylinder, 2 the rear rotatable cylinder, the front cylinder having a valve drum 3 and the rear cylinder 2, a valve drum 4 eccentrically arranged therein, both auxiliary to each other, the cylinders and valve drums have a separate axis, to form a convexo-concave or epicycloidal space 5 between the inner wall 6 of the cylinder and the outer wall 7 of the said valve drum. Valve mouths 8—8' and 9—9' are formed through the outer wall 7 of the valve drum and openings 10 and 11 on the side of said valve drum communicating with said mouths 8—8' and 9—9' respectively. A slidable pressure gate 12 is mounted between said valve mouths to divide the said valve mouths to separate the pressure of intake and outlet within the epicycloidal space 5. A shoe 13 is provided with a spring 14 to force the said shoe against the inner wall 6 of the cylinder. Axles 15 and 15' are furnished on the side of the pressure gate to keep the said pressure gate movable against the inner wall 6 of the said cylinder. A gate guide ring 16 is mounted on each side of said valve drums, said guide rings having on the inner side a bore 17 and a bushing 18 in said bore to hold an axle 15 in one ring 16 and an axle 15' in the opposite ring 16. Said plurality of guide rings 16 have each a circular groove 19 on one side to rest a spring 20 and ball bearing plate 21 and runner plates 22 and 23 therein. The ball bearing plate being provided with ball bearings 24. The guide ring 16 with its members of the groove 19 rest movably within a groove 25 of the hub 26 so as to allow the rims 27 and 28, Fig. 22, of the ring 16 to sink into the inner side of the groove 25 of the hub 26 and thereby allow room for heat expansion and contraction of the valve drum. The hubs 26 may have a threaded portion 29 against the threaded portion 30 of the cylinder, shown in Fig. 2, or be without threaded portions as shown in cylinder 31', Fig. 20 and Fig. 37. The hubs with cylinder 31' are shown in Fig. 20 and Fig. 37 merely for example on half side portion of the engine and therefore understood that Fig. 20 and Fig. 37 or Fig. 2 may have a pair of cylinders, to be known here as cylinders 31 and 31', or that the engine of Fig. 20 and Fig. 37 is capable of having cylinders 1 and 2. It is shown that each cylinder of the type 31 and 31' is provided with a pair of hubs 32 with packing rings 33, 34, 35, 36, 37 and with guide ring 38 (of the class shown in Fig. 23). The guide ring of Fig. 22 may be also used with cylinders 31 and 31'. And guide ring 16 of Fig. 22 for the engine shown in Fig. 2 may be also substituted for the guide ring of Fig. 21. The guide ring of Fig. 21 shown in cross section in Fig. 20, has a plurality of bores or sockets 39 for coil springs 40, a spring of which is separately shown in Fig. 29 and which may be substituted for the spring 20 of the spring system of Fig. 22. Each hub rests on a bearing 41 on the axle. The engine, Fig. 2, is provided with three hollow axle bodies or hubs. The center axle body 42 has axle 43 and 43', the front axle body 44 and axle 45 and the rear axle body 46 an axle 47, each of which has a hollow bore 48 and one or two side openings therein as inlet and outlet for intake and exhaust. The side openings 49, Fig. 2, of the front axle body 44 lead into the opening 50 of the engine bed 51, Fig. 3, while the opening 52, Fig. 10, of the axle body 44 leads into the opening 53 of the engine bed. The side opening 54 of the center axle body 42 leads into the opening 55 of the engine bed, while the side opening 56 of the center axle body leads into the opening 57 of the engine bed. And the side opening 58 of the rear axle body 46 leads into the opening 59 of the engine bed body, while the side opening 60 of the rear axle body leads into the opening 61 of the engine bed.

The engine of Figs. 1 to 14 inclusive is so constructed that either one or two of the said joining side openings may be used as inlet or outlet ports. In the engine of Fig. 19 to Fig. 40 inclusive, only one through opening is provided for inlet and two openings for outlet, the two outlet openings on one side can however be used as inlets and the one single side opening on the other side for outlet. And the engine of Fig. 19 to Fig. 40 may have also such double inlet and outlet ports as shown in Fig. 1 to 14, if the engine bed of Figs. 19 to 40 is provided with sleeve valves as shown in Fig. 4, or provided with sleeve valves 62, Fig. 43, and applied in the engine bed 63, as shown in Fig. 41 and Fig. 42.

The engine bed 63 is then to be provided with an opening 54 between the dotted lines 55, Fig. 36. And it is to be understood that the engine, Fig. 1 to Fig. 14, may be provided with a single side opening through each axle body as shown for example in the engine, Fig. 19 to Fig. 40 inclusive. And in that case, no sleeve valves will be needed in Fig. 1 to Fig. 14.

The intake pipe 64 and exhaust pipe 65 (shown in Fig. 2) may be reversed with the same effect without loss of power nor without change in motion since the movement of the sleeve valves provide the flow of pressure of intake and of exhaust to force the valve drum to rotate either to the right or left. It can be seen in the accompanying drawings, that a cylinder or pair of cylinders encompass each a valve drum, the cylinder of which is sided by hubs which rest on axles separately from those of the valve drum. The valve drum has a hub 66, a bore 67 therein with a shaft 68 through the said bore. The shaft is rotatably mounted as well as adjustably held within the front and rear axle bodies as for example in Fig. 2, Fig. 7, Fig. 8 and Fig. 9 or as in Fig. 12, or held adjustably at the center axle body for example Figs. 19, 20, 36 and 37. The shaft may have center, front and rear bearings of any type. The shaft may only rest within packing rings 69 mounted in the front and rear axle bodies if a mere center bearing is used.

It is shown that the packing rings 69 about the shaft in Fig. 2 are held by a threaded washer 69' to an inner countersunk portion of both front and rear axle bodies, while in Figs. 19 to 42, the packing rings are held by a plate 70 which plate may be held by screws 70'.

It is further shown that while the bearing of Figs. 1 to 17 inclusive, is composed of bushings 71 and 72 and a top part 73 which may be forced down upon the shaft by the wedge 74 through the action of the screw 75 in the threaded portion of the wedge 74, the wedge rests against the opposing key 76 while the plate 77 of the bearing is held by an adjustable screw 78 to allow the shaft to be lowered and with it the valve drum against the inner wall of the cylinder to form an air tight permanent closing gate, or otherwise called the fading point of the epicycloidal crescents of the epicycloid pressure chambers between the inner wall of the cylinder and outer diametrical wall of the valve drum.

The screw 78 is threaded into the lower key piece 79 which is keyed into the side walls 80 and 80' of the bearing box of Fig. 7. The bearing is protected by a cover 81 mounted slidably to the side walls 80 and 80'. However, the bearing may also take on a form such as (for example) shown in Fig. 12 in which four screws 84 perform the same function of holding and regulating the shaft correctly in proper place.

The bearings may be arranged in various ways and be of any nature with provisions of means to adjust the valve drum by adjusting the shaft. The axle body may be adjusted by a ring 85, Figs. 1 to 12 inclusive, or by screw rods 86 through holes 86' provided for said screws in the front and rear axle bodies as for example shown in Fig. 19 to Fig. 39, or by any other similar and numerous means to force the front and rear axle bodies toward the center to take up wear.

The hub for example may be screwed into the cylinder by a purchase of a tool A (shown by dotted line in Fig. 35) upon the inner rim of the cylinder at the point C and against the pin B of the hub to furnish leverage to release the hub 26 from the cylinder, or tighten the hub towards the side walls of the valve drum. And the said hub may have further a spring or a latch which may snap into one of the said spaces between the said cogs of the under rim of the cylinder to prevent the hub from releasing itself from the cylinder while the engine is set in motion.

The ring 85 may be marked by degrees and have a similar means by which the ring 85 is locked at a predetermined position. And said ring may have a means 87 for obtaining a purchase with a tool, to rotate the ring, or may have holes instead for insertion of a tool to screw the ring on its threaded portion 88 within the counterthreaded portion 89.

The rods 86, Fig. 19, have each a head 90 on one side and a nut 91 on the other to bring the front and rear axle bodies together to take up wear.

The valve drum, shown in Fig. 1 to Fig. 39 inclusive, may have adjustable sockets 92, Fig. 25, within its center outer diameter to meet female sockets 93 of the cylinder. Or the valve drum may have male sockets 94 with a pin hole 94', Fig. 24, placed to meet female sockets 93 as shown in Figures 32 and 30. Or may have male ribs, Fig. 27, and counterfemale ribs, Fig. 28, placed as shown in Fig. 30 and Fig. 33 to force the cylinder to rotate timely with the valve drum. However, if the rotation of the cylinder is not timed by the aforesaid gearing for reason of absence of said gears, then the natural friction between the outer wall of both the valve drum and the inner wall of the cylinder will wear down all high places of imperfect roundness of said walls to more perfect roundness during the operation of the engine since the strongest friction would take place at the point of greatest diameter of the valve drum and at the smallest diameter of the inner wall of the cylinder. Therefore, engines of smaller than two ton weight may be without such male and female sockets especially since the cylinder and valve drum as shown in Fig. 20 will in a lighter engine fairly follow each other without such cog means.

The engine in general of this class may have a cover 95.

The axle bodies in Fig. 1 to Fig. 18 inclusive are each held to the engine body by clamps 96 having threaded bolts 97 through holes 98' of clamps 96 followed by holes 98' of the engine bed, while the axle bodies in Fig. 19 to Fig. 40 are held to the engine bed by bolts 97, which reach through holes 99 of the axle body side flanges 100 and into screw threaded holes 98' of the engine bed.

The holes 99 of the flanges 100 in the front and rear members, Fig. 19 to Fig. 40, are oblong to allow the adjustment as well as hold the adjustment provided by nuts 90 of the rods 86.

The engine bed is provided with longitudinal ports 101—101' in the form of bores closed at one end by plugs 102—102', the plugs of which are partly threaded into counter-threads 103—103' of the bore, the other ends of the ports have threaded portions 104—104' to provide attachment of screw threaded intake and exhaust pipes 64, 65. However, it is to be understood that each port 101 and 101' may be closed with plugs 102 at each end, and that the exhaust and intake pipes may be connected at the bottom under side of the engine bed to channels provided in the cast of the engine bed which aim to lead to the said ports directly between the side openings of the ports, and that sleeve valves would in that event have additional side windows to meet the channels.

The engine may have openings 50 and 59 leading to ports 101 and opening 57 leading to port 101', or have opening 55 leading to port 101, and opening 53 and 61 leading to port 101'. However, the engine body may have also openings 50, 55, and 59 leading to port 101 and have openings 53, 57 and 61 leading into port 101' if rotatable sleeve valves 105 and 106 or slidable sleeve valves 62, 107, 108 and 109, Fig. 42, be used to close either by a turning or sliding motion some of the said openings to change the flow of intake and exhaust to force the reverse rotation of the valve drum as desired.

It can be seen in Fig. 4 that this is accomplished by turning the windows 110, 111, 112, 113, 114 and 115 of the rotatable sleeve valves 105 and 106 from or to the openings of the engine bed. For example, the valve 106, Fig. 4, shows windows 113 and 115 turned away from openings 53 and 61. And the window 114 turned over the opening 57 to allow the flow through the opening 57 towards the valve drum, while the sleeve valve 105 shows windows 110 and 112 meeting openings 50 and 59 to allow the flow of exhaust through windows 110 and 112 and holding opening 55 closed.

Each sleeve valve has a spiral known as spiral grooves 116 and 116' into which moves an extension 117 and 117' of the sleeve control shanks 118, 118', Fig. 16. The control shanks may be connected for example by a means 119 by which the shanks may be drawn to allow the extensions 117, 117' to be drawn the full length of the spiral grooves 116, 116' to force the rotation of the said sleeves to a sufficient degree to reverse the windows and thereby change the flow of intake and exhaust which will in turn reverse the rotation of the engine.

It is understood that the same rotatable sleeve valves shown in Fig. 4 with the corresponding means of Fig. 16 is also applicable with corresponding changes in the engine of Fig. 19 to Fig. 40 inclusive. And that the slidable sleeve valve system shown in Figs. 41, 42 and 43 is also applicable in Figs. 1 to 15 inclusive.

While the shanks 118, 118' of Fig. 16 move within bores 120, 120' of the engine bed, the shanks 121, 122, and 123 and 124 of the lever of Fig. 45 move within grooves 125 and 126 on the bottom under side of the engine bed, Fig. 44. Each pair of said shanks may be moved by some form of attachment capable of being applied to holes 127 and 128 of the lever members, as lever part of Fig. 45, or by a means 129 and 130, Fig. 42, formed to provide a purchase for moving the levers or shanks. Each shank is provided with a bent flange 131 having a split, the split end of 131 to pass through a slot 132 of the engine body and through the side of slot 133 of a sleeve valve as shown in Fig. 42 and Fig. 43. The split ends of 131 are then bent apart as shown in Fig. 41 to attach the flanges to the sleeves. The flange 131 moves the full predetermined length of the slot 132.

Fig. 44 shows how the lever is moved when the sleeve valves are arranged as shown in Fig. 42. Fig. 45 shows the same lever with its movement reversed where it would have caused the valves 62 and 107 to be moved apart and valves 108 and 109 together, exactly reverse of valve location shown in Fig. 42, for allowing inlet to openings 53, 61 and exhaust at opening 55, preventing inlet into opening 57 and preventing exhaust at opening 50 and 59.

The engine bed may have, for example, as shown in Fig. 40, bores 134 and 135 through the bottom side for bolts or rivets 136 or other means to fasten the engine bed to another element. The bores may also be of a larger type as for example bores 137, 138, Fig. 3, with plugs 139, Fig. 9, each of which is threaded at 140 to counterthreads 141 of the engine body. The said bores 137, 138 are furnished to act chiefly as a means to reach the female cogs of Fig. 26 with a tool for adjusting the said cogs. A means for making the engine body fast may be then provided by a front flange 142 and rear flange 143 provided with holes 144, Fig. 1. The shaft is provided with key slots 145 opposite the key slot 146 of the valve drum adjacent to key 147. A hollow bore 148 is provided in said shaft, the hollow of which may be reduced at one end and closed at the other by a screw 149. Said hollow bore has a rod 150 provided with a plurality of longitudinal channels 151. There are oil holes 152 in the shaft near the bearings 73—77, Fig. 8, 83, Fig. 12, 220—221, Fig. 36, etc., and 15 of Fig. 5 and Fig. 9 near the valve drum, the said holes leading from the bore 148 to the outer diameter of the shaft to meet the bearings and the valve drum. A slot 153 is provided on each oil hole of the shaft near the valve drum to keep the flow of oil connected to the oil hole 154 of the gate block 155 of the gate space 155'. The said shaft may be provided with a reduced end 156 having an annular groove 157 to allow adjustment and attachment of an oil pump as shown in Figs. 46 to 81 inclusive, and said shaft has an eccentric reduced end 158, as shown in Fig. 55, partly as a means to provide suction and compression in the pump. The shaft may be provided with a plug 159, Fig. 82, to take the place of the aforesaid reduced end Fig. 55. The plug may be forced dry into the shaft bore enlargement 160 or be screwed in and be tool punctured at the point 161 of the shaft over a slot 162 of the plug 159 to prevent the plug from releasing itself from the bore enlargement 160.

The oil pump is mounted on the shaft and powered by the rotation of the shaft for feeding lubricant to the engine through the channels 151 of the rod 150 in the hollow of the shaft.

An oil filter may be used as shown for example, having a casing 163, Fig. 52, provided with a head 164 partly screwed in the casing and having a side opening 165 for an oil pipe 166 and a hole 167 meeting the side hole 168 of the oil pipe; or having a casing 169, Fig. 54, into which the oil pipe is threaded at the casing head 164'. The casing, Fig. 53 and Fig. 54, being otherwise practically the same in detail of construction, are each provided with an inner space of reduced diameter 170 against which is placed a screen 171, Fig. 57, to prevent the thereto adjusted felt disk 172 from moving over the oil hole. The disk 172 is followed by a narrow ring 173 which fits against the inner wall 174 of the casing. This ring 173 is followed by a plurality of felt disks each of which may be of heavier or coarser material and with a ring 173 between each disk to prevent the felt disks from being drawn too tightly together at the center when the closure 175 is screwed on as shown in Fig. 52 and Fig. 53, the under rim 176 of the closure 175 holds the disks and rings and screen within the casing. The oil is drawn through the fabric of the disks 172 into oil pipe 156, into a space of the upper joint 177 of the oil gauge to drip from the said space through a glass tube 178 into the space 179 of the lower joint 180 from where the oil is sucked into oil hole 181 past the needle 182 of the screw threaded needle valve 183 and into a hollow space 184 provided between the pump cap 185 and automatic valve head 186.

The head is provided with screw holes 187 and oil holes 188 and 189 and with an outer beveled rim 190 to fit air tight against an inner counter beveled rim of the pump cap when screws 191 and 191' are firmly applied through the pump cap into the screw holes of the valve head, thus, the head is forced to remain stationary with the pump cap and allow the housing or cylinder 192 of the pump to rotate certain degrees to one side in the direction of the arrow, Fig. 58. The rotation is limited by the extension of the pin 193 into the notch 194 of the valve head, the valve head being shown separately in Fig. 61 and partly in cross-section in Figs. 58, 59 and Fig. 60. This allows the oil to be sucked through the hole 189 into the cylinder port 195 into the convexo-concave space 196 formed by the eccentric end 158 of the shaft. And the oil gate 197 is provided with a spring 198 enclosed by a screw threaded plug 199. The said gate moves against the said reduced end 158 as shown in motion by direction of arrows in Figs. 67, 68, 69 and 70, to form a suction on the side of the gate by enlargement of the epicycloidal space and compression by reduction of the said space against the other side of the gate through rotation of the eccentric 158. The high pressure oil is then forced into the cylinder port 200 and from the cylinder port 200 into the horizontal hole 201 to follow the inner vertical hole 202 to the horizontal hole 203, Figs. 61, 62 and Fig. 50, and as shown by direction of arrows, Figs. 62, 55, then, from hole 203 through the center oil hole 204 at the end of the shaft to the rod 150 provided with channels to divide and distribute the oil to various sections of the engine. The casing 192 is provided with a screw threaded closure 205 which is screwed into counter inner threaded portion 206 of the housing. A plurality of rings 207 of the type of Fig. 80 are provided in the housing. Some of said rings expanding against the inner wall 208 of the housing and others contracting against the outer reduced section 156 of the shaft to act as packing to prevent the oil from passing the rings. An annular groove 157 provided with a ring 209, Fig. 81, which anchors the housing 192 to the shaft through the action of the coil spring 210 against the closure 205 of the housing. Degrees on the outer surface of the housing met by a degree indicating stamp 211 of the closure 205, which if turned to the left will release the spring to release the tension of the inner wall 212, Fig. 74, against the wall 213, Fig. 55 and Fig. 82, to allow the oil to spill past the said wall to prevent over feeding to the engine; reversed action will permit more flow of oil to the engine. It can be seen by the foregoing that the flow of oil through oil hole 189 of the valve head is provided if the motion of the shaft rotates the casing a provided limited degrees in the direction of the arrow as shown in Figs. 58, 67, 68, 69 and 70. Fig. 59 is neutral, while Fig. 60 shows that the rear member 214 is turned with the housing in the direction of the shaft directly reversed to the motion heretofore described. The rear member 214 is held to the housing by screws 215 in holes 215' and therefore turns with the housing. The pin 193 of the rear member 214 is shown in Fig. 58. This action changes the connection of oil holes so as to shut off the flow of oil through holes 189 and start the flow through hole 188 to port 200 from where oil is drawn into the convexo-concave chamber and forced into the port 195 and from there to 201, 202, to 203 into the shaft by the reverse action of suction and discharge shown in Figs. 63 to 66 inclusive. The needle valve 183 may be partly closed in that over pressure causes oil leakage past the packing rings 20;.

It can be seen from the foregoing that the oil pump is constructed to be operated by the eccentric section of the shaft and will continue to pump oil to the center bore of the shaft regardless of the speed of right or left turn of the shaft and therefore will feed oil in proportion consumed by the proportion of motion of the engine.

It is further understood that an oil gate 216 as shown in compressed state, Fig. 75, and expanded state, Fig. 76, may take the place of three parts, the oil gate 197, coil spring 198 and plug 199, Fig. 50, if the housing of the oil pump is provided with a slot 217 as shown in Figs. 71, 73 and 74, and the gate 216 be placed as shown in Fig. 72. The oil gate may have a replaceable T formed shoe 218, Fig. 77, or a C formed shoe 219, Fig. 78, thereon.

The oil feed system as shown in Fig. 9 may not provide oil to the center bearing as shown in Figs. 36 and 37, unless it is a bearing which completely surrounds the shaft. The bearing, Figs. 36, 37, has plugs 220 and 221 and a lubricant container 222 which provides lubrication through the hollow pipe 223 past a key 224 to the shaft. The lubricant container is threaded into the top center axle body of the engine and by its nozzle which rests on the hollow tube 223, the tube rests on the extension 225 of the key 224 held into side notches of the plugs 220 and 221 to prevent uneven wear on the bearing surface of the said plugs.

The key is provided with side grooves 226, Fig. 18, to allow lubrication to pass to the shaft between the plugs. The plugs are forced firmly against the shaft by screw threaded bolts 227 and 228 which are screw threaded into the center axle body to meet the shaft at a 90 degree angle.

It is understood that my engine of the class described may have valves 105—106 or 62 or merely plain ports 101—101'.

It is further understood that the engine body may also be modified in that rounded or square axle body beds be provided instead of the 90 degree angle formed axle body bed 229, 230 and 231.

The preferred axle body bed as well as the preferred longitudinal ports 101, 101' may be manufactured more accurately with less cost because it permits straight through tool movement by machine, and allows simplicity and much uniformity of parts.

The drawings of the engine show the flow of intake and exhaust with related motion for example altogether in one direction, but it is to be understood that the direct reverse motion is to be also accomplished with the same force and effect, and that this applies also to the automatic oil pump.

Fig. 4 shows for instance the intake through the window 114 continuing its flow through the joining openings 57 and 56 into the center bore 48 and through the openings 10 and 10' of the valve drum into the hollow of the valve drum and through the side ports, 9, or 9 and 9' (Figs. 5, 11, 15, 20 and 30) to the convexo-concave epicycloidal space 5 between the inner cylinder wall and the outer valve drum wall with force of pressure against the gate 12, (Fig. 39). The gate, after passing the convexo-concave fading points (Fig. 13) allows outlet through the ports 8, or 8—8' into the valve drum and out of the opening 11 of the valve drum as shown in Fig. 5 and through openings 44, 50, and 58, 59 of the axle body and engine bed, (and in case the ports 101, 101' are provided with sleeve valves) through windows 110 and 112 into the sleeve valve and out through the exhaust pipe; or from openings 50, 59 of the engine bed into ports 101, 101' and out into the exhaust pipe. The rotation of the valve drum is reversed if the flow of intake be directed from windows 113, 115 and out through window 111, (see Fig. 4).

It is to be further understood that the engine of the class described would operate with only one valve drum within one single cylinder between front and rear axle bodies, but of course, not as evenly as duad power bodies. It can be seen that a gate within a cylinder is always reverse from the gate of the next cylinder as shown in Figs. 11 and 13, to provide a steady smooth drawing power. Thus it will be seen that I have provided a specific light, compact, and powerful smoothly running engine of a class capable of being broad in use and most reliable and also most durable due to the construction and arrangements of parts which can be easily replaced and on which the wear can be taken up correctly. And it is to be further understood that various arrangements for bearings can be made, that oil may be fed to the engine by other old or new means therefor, while I have herein shown and particularly described the embodiments of my invention for said various uses within the spirit of my invention, I do not wish to be understood as limiting myself to precise details of construction shown, as further changes may readily be made without departing from the spirit of my invention.

I desire to secure Letters Patent for what I claim as new:

1. An engine of the class described with a rotatable regulatable cylinder having side walls, an engine bed having fixed regulatable hollow hubs, each said side wall being provided with a center opening and a means to journal a said hollow hub, a rotatable hollow valve drum eccentrically encompassed within the rotatable inner wall of said cylinder, a drive shaft passing through the axis center of the said drum and eccentrically through the said hubs, said engine bed being provided with longitudinal ports having side channels directed to register with side channels in the said hubs, an opening in each side wall of said drum, an element forming a gate provided with a means on each side thereof to keep the gate moving within the axis of the said cylinder and an extending means on said gate cooperating with an expanding means to take up clearance due to wear between said gate and the inner circumference wall of the said cylinder, an open port hole provided in the outer circumference wall of said drum at each side of said gate, a provision of means on said engine bed and attached to said hubs to move said hubs to take up wear of the friction surface of the said hubs and of horizontally rotatable members in alignment with the cylinder axis, a predetermined number of said hubs having adjustable means to take up clearance due to wear of said shaft and of said inner wall of said cylinder and outer wall of said drum.

2. In an engine of the class described, an element forming an engine bed, a rotatable valve drum resting by means of a shaft in an adjustable element mounted on said engine bed, a rotatable cylinder mounted on said adjustable element, said cylinder and the said adjustable element eccentrically encompassing the said valve drum with said shaft, a means on said adjustable element to force the outer circumference wall of the said valve drum in direct contact with the inner circumference wall of the said cylinder, longitudinal ports being provided in said engine bed with side branching channels in communication with said valve drum.

3. In an engine of the class, an element forming an engine bed, a rotatable valve drum resting by means of a shaft in an adjustable element mounted on said engine bed, a rotatable cylinder mounted on said adjustable element and the said cylinder and the said adjustable element eccentrically encompassing the said valve drum with said shaft, a means on said adjustable element to force the outer circumference wall of the said valve drum in direct contact with the inner circumference wall of the said cylinder, longitudinal ports being provided in said engine bed with side branching channels in communication with said valve drum, a gate with guide rings having bearings and plates mounted within the said cylinder, expandible and contractable rings in said cylinder and about said shaft.

4. In an engine, the combination of a pair of rotatable hollow drums each provided with a center bore and with side wall ports and outer circumference ports, a gate slidably mounted between the said outer circumference ports, said ports being in communication with each other, aligned hollow axles of a common axis and provided with side ports, an adjustable drive shaft mounted through the said center bores of the said drums and through the said hollow of said axles, an element forming an engine bed provided with means to support said axles, side walls on each of said cylinders and each cylinder having a center port movably mounted on said hollow axles, longitudinal bores in said engine bed provided with side channels in communication with said side ports, a means on said axles for taking up wear of said axles and of a plurality of friction surfaces in alignment with the axis of the said axles, and a separate means on said axles for taking up wear of said shaft and of a plurality of friction surfaces in alignment with the axis of said shaft and of inner circumference walls of the said cylinders.

5. An engine with a rotatable cylinder having side walls each of said side walls being provided with a center opening, a plurality of hollow non-rotatable axles one for each said opening, an element forming a hollow drum provided with a drive shaft extending eccentrically through said axles, a slidable gate provided with a guide means and mounted extendibly from within said drum, open ports near each side of said gate through the outer circumference wall of the said drum and an open port through each side wall, an engine bed having adjustable means to move said axles to take up wear of parts in alignment with the cylinder axis, a predetermined number of said axles having adjustable shaft bearings and a separate adjustable means to move the said shaft horizontally from the axis of the said cylinder to take up wear of joining circumference walls of a said drum and cylinder at the crescent point of the convexo-concave chamber formed by a said drum and cylinder.

6. In an engine of the class described, an element forming an engine bed provided with longitudinal ports therein for intake and exhaust, a rotatable cylinder having side walls each provided with a female axle, a rotatable hollow drum having one slidable gate and an open port on each side of the said gate at the outer circumference wall of said drum, an open side wall port in said drum, an adjustable changeable hollow male axle fitting into each said female axle and both said axles acting as ports, a drive shaft on said drum provided with a separate axis from the axis of the said cylinder, a rotatable guide means mounted within the inner side walls of the said cylinder and the said drum and cohesively attached to the said slidable gate to keep the gate moving against the inner wall of the said cylinder to separate inlet from exhaust, a lever, a plurality of sleeve valves movably mounted in the said longitudinal ports of the said engine bed to reverse both the inlet and exhaust flow to reverse the rotation of the said drum by a single move of the said lever.

7. In an engine of the class described, an element forming an engine bed provided with two longitudinal ports for transmission of intake and exhaust, a rotatable front cylinder, a rotatable rear cylinder longitudinally aligned with the front cylinder each of said cylinders having side walls and each being provided with a female axle, a rotatable hollow front drum having one slidable gate, a rotatable hollow rear drum having one slidable gate directly opposite in location to the gate of the said front drum, open ports provided on each side of said gate in the outer circumference wall of said drums, open port holes provided through the side walls of said drum, male axles adjusted to the said engine body and passing into said female axles of the said side walls of the said cylinder, said male axles being hollowed for transmission of intake and exhaust, a drive shaft connecting said drums and being provided with an axis separate from that of the said cylinders, a rotatable guide means mounted within the inner side walls of the said cylinders and the said drums and cohesively attached to said slidable gates to keep the same against the inner walls of the said cylinders to separate inlet from exhaust, a uniform plurality of sleeve valves movably mounted in the said longitudinal ports of the said engine bed, a lever directly connected to said sleeves to move said valves by one full move of the said lever to a position to reverse the flow of intake and exhaust to reverse the motive power of the engine.

8. In an engine of the class described, an element forming an engine bed provided with two longitudinal ports open at both ends and having a separate means on its ends to close said ports, a rotatable cylinder having side walls each provided with a female axle, an element forming a rotatable hollow drum having one slidable gate and an open port hole on each side of the said gate at the outer circumference wall of said drum, an open side wall port through each side wall of said drum, an adjustable changeable hollow male axle fitting into each of said female axles and both said axles acting as ports, a drive shaft on said drum provided with a separate axis from the axis of the said cylinder, a rotatable guide means mounted within the inner side wall of the said cylinder and the said drum and attached cohesively to the said gate to keep the gate slidable against the inner wall of the said cylinder to separate inlet from exhaust, side branching channels provided in said engine bed leading from the said longitudnal ports into the said hollow male axle to allow the passage of intake and exhaust.

9. An engine having a rotatable hollow shaft with an annular groove and a convexo-concave epicycloidal groove at one end of the said shaft, a lubricant pump extending upon said shaft and powered by direct rotary motion of the said shaft, said pump being arranged to deliver lubricant to the hollow of said shaft, a stationary slidable gate against said convexo-cancave groove, a valve head provided with ducts, automatic means to move the said valve head to reverse the flow of lubricant to allow continuation of the flow of lubricant to the said hollow of the said shaft when rotation of the said shaft is reversed, a duad means on the said pump to prevent escape of lubricant and to take up wear, a means on said annular groove to hold the said pump on the said shaft, and a means to enclose and adjust said escape preventing means and wear take-up means and said holding means.

10. In an engine, the combination of a rotatable hollow shaft having an annular groove and a convexo-concave epicycloidal groove at one end thereof, a rod provided with longitudinal outside channels, a lubricant pump powered by the rotary action of the said shaft and having a housing, a collar to said annular groove to shackle said pump housing to the said shaft, an element forming a self expandible slidable gate stationarily mounted in said pump housing against the said convexo-concave groove, longitudinal ports close to the side of the said gate, a spring, expandible and contractable packing rings, a closure to keep said spring and said packing rings confined, a movable pump-head provided with valve ports, said valve ports alignable with said longitudinal ports, and means in said pump-head to move the pump-head to align one of the said valve ports with one of the said longitudinal ports to allow continuation of flow of lubricant to the said hollow of the said shaft when the rotation of the said shaft is reversed.

11. In an engine of the class described, the combination of an element forming an engine bed, ports provided in said engine bed, a rotatable valve drum provided with ports in the walls thereof, a slidable gate, a rotatable cylinder eccentrically encompassing said valve drum, a hub at each end of said cylinder, an axle mounted on the said engine bed to support the said hubs, a guide means within the said cylinder cohesive to the said gate, a means in said engine bed ports to reverse the intake and exhaust flow to the said valve drum, bearings with plates mounted between said hub and said valve drum, an adjustable means on the said engine bed to take up wear of the said hub bearings and plates, a shaft, an oil distributor needle in said shaft, a means on the said engine bed to press the said shaft to force the said valve drum to form a permanent closing at the fading points of the epicycloidal pressure chamber, said valve drum being mounted on the said shaft, a means on said shaft to prevent the escape of intake and exhaust, a bearing on said engine bed to rest the said shaft, a key on said shaft to key the said valve drum thereto, an oil pump, said oil pump being mounted on the end of said shaft and arranged to feed oil to the said engine through the said distributor needle, substantially as described.

12. In an engine of the class described, an element forming an engine bed, ports provided in said engine bed to allow means to reverse the action of the engine, a rotatable valve drum provided with valves in the walls thereof, a slidable gate between said valves, a rotatable cylinder eccentrically encompassing said valve drum, a hub at each end of said cylinder, an axle mounted about the said engine bed to support the said hubs, and a guide means within the said cylinder cohesive to the said gate, a means in said engine bed ports to reverse the intake and exhaust flow to the said valve drum, bearings with plates mounted between a said hub and said valve drum, an adjustable means on the said engine bed to take up wear of the said hub said bearings and plates, a shaft, a rod in said shaft provided with longitudinal lubrication channels, a means on the said engine bed to press the said shaft to force the said valve drum to form a permanent closing gate at the fading points of the epicycloidal pressure chamber, said valve drum being mounted on the said shaft, an air tight means on said shaft to prevent the escape of inside oil pressure, a bearing to the said shaft, a means on said shaft to key the said valve drum thereto, an automatic oil pump directly connected at one end of said shaft and powered by the said shaft to feed lubricants to the said engine through the said channels of the said rod, a convexo-concave groove within said pump at the end of the said shaft, oil valves, an automatic means in said pump to reverse the said oil valves to allow automatic continuance of the flow of lubricant to the said channeled rod when the rotation of the shaft is reversed, an oil pump gate and means to cooperate with the said oil pump gate and the said convexo-concave groove to pump the oil, an oil gauge mounted on said pump, and a filter mounted on said oil gauge substantially as set forth.

JOHN SCHLITZ.